(12) United States Patent
Noh et al.

(10) Patent No.: US 9,223,178 B2
(45) Date of Patent: Dec. 29, 2015

(54) LIQUID CRYSTAL DISPLAY DEVICE AND METHOD OF MANUFACTURING THE SAME

(75) Inventors: So-Young Noh, Seoul (KR);
Seung-Ryull Park, Goyang-si (KR);
Jin-Pil Kim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 972 days.

(21) Appl. No.: 13/160,011

(22) Filed: Jun. 14, 2011

(65) Prior Publication Data

US 2012/0081641 A1     Apr. 5, 2012

(30) Foreign Application Priority Data

Sep. 30, 2010 (KR) .................. 10-2010-0095349

(51) Int. Cl.
*G02F 1/1339* (2006.01)
*G02F 1/1337* (2006.01)
*G02F 1/1362* (2006.01)

(52) U.S. Cl.
CPC ...... *G02F 1/13394* (2013.01); *G02F 1/136286* (2013.01); *G02F 2001/13396* (2013.01)

(58) Field of Classification Search
CPC .......... G02F 1/13394; G02F 1/133377; G02F 2001/13396; G02F 1/136286
See application file for complete search history.

(56) References Cited

U.S. PATENT DOCUMENTS

| | | | |
|---|---|---|---|
| 6,897,918 B1 * | 5/2005 | Nonaka et al. ............ | 349/106 |
| 2005/0243262 A1 * | 11/2005 | Kim et al. ................ | 349/156 |
| 2007/0159588 A1 * | 7/2007 | Yoon ........................ | 349/156 |
| 2009/0015957 A1 * | 1/2009 | Kamada et al. ........... | 359/891 |
| 2009/0115954 A1 * | 5/2009 | Tseng et al. .............. | 349/156 |
| 2011/0058137 A1 * | 3/2011 | Huang et al. ............. | 349/156 |

FOREIGN PATENT DOCUMENTS

| CN | 101430464 A | 5/2009 |
|---|---|---|
| JP | 2007-272222 A | 10/2007 |
| KR | 10-2007-0047087 A | 5/2007 |
| KR | 10-2008-0081674 A | 9/2008 |
| TW | 200411260 A | 7/2004 |
| TW | 200745627 A | 12/2007 |

* cited by examiner

*Primary Examiner* — Lauren Nguyen
*Assistant Examiner* — Anthony G Quash
(74) *Attorney, Agent, or Firm* — Birch, Stewart, Kolasch & Birch, LLP

(57) ABSTRACT

A liquid crystal display device includes an array substrate including gate and data lines crossing each other on a first substrate to define a pixel region, and a thin film transistor and a pixel electrode in the pixel region, a color filter substrate including a black matrix on a second substrate and including an opening corresponding to the pixel region, and a color filter layer filling the opening, and a liquid crystal layer including a first patterned spacer contacting the array substrate and the color filter substrate, and corresponding to the thin film transistor of the array substrate, and a second patterned spacer having a first width along a length direction of the gate line, and a second width along a width direction of the gate line, contacting the color filter substrate and being spaced apart from the array substrate, and corresponding to the gate line.

8 Claims, 12 Drawing Sheets

LIQUID CRYSTAL DISPLAY DEVICE AND METHOD OF MANUFACTURING THE SAME

The present invention claims the benefit of Korean Patent Application No. 10-2010-0095349, filed in Korea on Sep. 30, 2010, which is hereby incorporated by reference for all purposes as if fully set forth herein.

BACKGROUND OF THE INVENTION

1. Field of the Invention

The present invention relates to a liquid crystal display device, and more particularly, to a liquid crystal display device and a method of manufacturing the same.

2. Discussion of the Related Art

Until recently, display devices have typically used cathode-ray tubes (CRTs). Presently, many efforts and studies are being made to develop various types of flat panel displays, such as liquid crystal display (LCD) devices, plasma display panels (PDPs), field emission displays, and electro-luminescence displays (ELDs), as a substitute for CRTs. Of these flat panel displays, LCD devices have many advantages, such as a higher resolution, a lighter weight, a thinner profile, a more compact size, and low voltage power supply requirements.

In general, an LCD device includes two substrates that are spaced apart and face each other with a liquid crystal material interposed between the two substrates. The two substrates include electrodes that face each other such that a voltage applied between the electrodes induces an electric field across the liquid crystal material. An alignment of the liquid crystal molecules in the liquid crystal material changes in accordance with the intensity of the induced electric field into the direction of the induced electric field, thereby changing the light transmissivity of the LCD device. Thus, the LCD device displays images by varying the intensity of the induced electric field.

FIG. 1 is a perspective view illustrating an LCD device according to the related art.

Referring to FIG. 1, the LCD device 1 includes an array substrate 10, a color filter substrate 20 and a liquid crystal layer 30. The array substrate 10 includes a gate line 14 and a data line 16 on a first substrate 12 that cross each other to define a pixel region P. A pixel electrode 18 and a thin film transistor Tr, which acts as a switching element, are positioned in each of the pixel region P. The thin film transistors Tr, which are disposed adjacent to a position where the gate lines 14 and the data lines 16 cross, are disposed in a matrix form on the first substrate 12. The color filter substrate 20 includes a color filter layer 26 including red (R), green (G) and blue (B) color filter patterns 26a, 26b and 26c in respective pixel regions P on a second substrate 22, a black matrix 25 between the color filter patterns 26a to 26c, and a common electrode 28 on the color filter layer 26 and the black matrix 25.

Spacers are located between the array substrate 10 and the color filter substrate 20 to maintain a cell gap therebetween. The spacers may be a ball spacer or a patterned spacer. Further, a seal pattern is formed along peripheral portions of the array substrate 10 and the color filter substrate 20 to attach the array substrate 10 and the color filter substrate 20 and prevents liquid crystal molecules of the liquid crystal layer 30 from leaking. Further, a polarizing film may be formed on at least one of the outer surfaces of the array substrate 10 and the color filter substrate 20. Further, a backlight supplying light is located below the array substrate 10.

FIG. 2 is a plan view illustrating an LCD device including a patterned spacer according to the related art, and FIG. 3 is a cross-sectional view taken along a line of FIG. 2.

Referring to FIG. 2, the LCD device 35 includes a gate line 43 and a data line 55 crossing each other on a first substrate 40 of an array substrate to define a pixel region P. Red (R), green (G) and blue (B) color filter patterns 76a, 76b and 76c are formed in red (R), green (G) and blue (B) pixel regions P, respectively, of a color filter substrate. In each pixel region P, a gate electrode 45 connected to the gate line 43, a source electrode 58 connected to the data line 55, and a drain electrode 60 spaced apart from the source electrode 58 are formed.

The drain electrode 60 is connected to a pixel electrode 67 through a drain contact hole 65. The gate electrode 45, and the source and drain electrodes 58 and 60 form a thin film transistor Tr.

Patterned spacers 83 are formed between the first substrate 40 and a second substrate 70 and spaced part from one another.

Referring to FIG. 3, the gate electrode 45 and the gate line 43 are formed on the first substrate 40, and a gate insulating layer 47 is formed on the gate line 43. A semiconductor layer 50 is formed on the gate insulating layer 47 over the gate electrode 45. The semiconductor layer 50 includes an active layer 50a and an ohmic contact layer 50b. The source and drain electrodes 58 and 60 are formed on the ohmic contact layer 50b. A passivation layer 63 is formed on the source and drain electrodes 58 and 60. The pixel electrode 67 is formed on the passivation layer 63 and contacts the drain electrode 60 through the drain contact hole 65.

A black matrix 73 is formed on the second substrate 70 and includes openings. A color filter layer 76 includes the red (R), green (G) and blue (B) color filter patterns 76a, 76b and 76c corresponding to the respective openings of the black matrix 73. A common electrode 79 is formed on the color filter layer 76.

An alignment layer is formed on each of the pixel electrode 67 and the common electrode 79. A liquid crystal layer 90 is formed between the array substrate and the color filter substrate.

In general, the patterned spacer 83 is formed on the color filter substrate attaching the color filter substrate and the array substrate and maintaining a cell gap from each other. The patterned spacer 83 contacts both the color filter substrate and the array substrate. However, when the LCD device 35 is pressed, a restoring force to its original cell gap at the pressed portion is weak resulting in a press defect or a touch defect. This is because an elasticity of the patterned spacer 83 is less than that of the ball spacer made of a silica material. Accordingly, the patterned spacer 83 is not restored as easily due to a friction between the patterned spacer 83 and the array substrate.

To resolve the above mentioned problems, an LCD device including two different types of patterned spacer is developed.

A first patterned spacer of the two patterned spacers contacts both of an array substrate and a color filter substrate in order to function to maintain a cell gap. A second patterned spacer of the two patterned spacer is spaced apart from the first patterned spacer. In a regular state, one end of the second patterned spacer contacts the color filer substrate and the other end of the second patterned spacer does not contact the array substrate. When an external pressure is applied, the other end of the second patterned spacer contacts the array substrate. Accordingly, the second patterned spacer maintains the cell gap along with the first patterned spacer against the external pressure and improves the restoring force, and thus reduces the press defect or the touch defect. In other words, the second patterned spacer functions as a press prevention spacer.

However, when the external pressure is applied and the second patterned spacer contacts the array substrate, the alignment layer of the array substrate may be defected due to the pressure by the second patterned spacer. This causes liquid crystal molecules over the defected portion to be aligned disorderly and operated abnormally resulting in a light leakage.

To resolve the problems, a black matrix corresponding to the second patterned spacer is designed to have a width wide enough to prevent the light leakage around the second patterned spacer. In other words, the width of the black matrix is configured to be 50 µm (micrometers) wider than that of the second patterned spacer. However, an increase of the width of the black matrix causes a decrease of an aperture ratio.

In general, the first and second patterned spacers each have a same cylindrical shape as shown in FIG. 3, and have a diameter of about 18 µm to about 20 µm in consideration of the restoring force and the press prevention. When the diameter of the patterned spacer is about 18 µm, the black matrix is formed to have a width of about 68 µm (18 µm+50 µm).

As described, as the width of the black matrix increases, the aperture ratio decreases, resulting in decreased transmissivity and brightness of displays.

SUMMARY OF THE INVENTION

Accordingly, the present invention is directed to a liquid crystal display device and a method of manufacturing the same which substantially obviates one or more of the problems due to limitations and disadvantages of the related art.

An advantage of the present invention is to provide a liquid crystal display device and a method of manufacturing the same that can improve aperture ratio and brightness.

Additional features and advantages of the present invention will be set forth in the description which follows, and in part will be apparent from the description, or may be learned by practice of the invention. These and other advantages of the invention will be realized and attained by the structure particularly pointed out in the written description and claims thereof as well as the appended drawings.

To achieve these and other advantages and in accordance with the purpose of the present invention, as embodied and broadly described herein, a liquid crystal display device includes an array substrate including: gate and data lines crossing each other on a first substrate to define a pixel region; and a thin film transistor and a pixel electrode in a pixel region; a color filter substrate including: a black matrix on a second substrate and including an opening corresponding to the pixel region; and a color filter layer filling the opening; a first patterned spacer having a cylindrical shape, contacting the array substrate, and the color filter substrate and corresponding to the thin film transistor; a second patterned spacer having a first width along a length direction of the gate line, and a second width along a width direction of the gate line and less than the first width; and a liquid crystal layer between the array substrate and the color filter substrate, wherein the second patterned spacer is spaced apart from the array substrate and corresponds to the gate line.

In another aspect, a method of manufacturing a liquid crystal display device includes forming a color filter substrate including a black matrix that is on a first substrate and includes an opening, and a color filter layer that fills the opening; forming an organic material layer on the color filter layer; exposing light to the organic material layer using a photo mask that includes a first transmissive portion having a circular shape, a second transmissive portion having a rectangular shape and having first and second widths, and a blocking portion; and developing the light-exposed organic material layer to form a first patterned spacer having a first diameter and corresponding to the black matrix, and a second patterned spacer having third and fourth widths.

According to an embodiment of the present invention, a liquid crystal display device includes an array substrate including gate and data lines crossing each other on a first substrate to define a pixel region, and a thin film transistor and a pixel electrode in the pixel region, a color filter substrate including a black matrix on a second substrate and including an opening corresponding to the pixel region, and a color filter layer filling the opening, and a liquid crystal layer between the array substrate and the color filter substrate including a first patterned spacer having a cylindrical shape, contacting the array substrate and the color filter substrate, and corresponding to the thin film transistor of the array substrate, and a second patterned spacer having a first width along a length direction of the gate line, and a second width along a width direction of the gate line and being less than the first width, the second patterned spacer contacting the color filter substrate and being spaced apart from the array substrate, and corresponding to the gate line.

According to an embodiment of the present invention, a method of manufacturing a liquid crystal display device includes forming a color filter substrate including a black matrix that is on a first substrate and includes an opening, and wherein a color filter layer that fills the opening, forming an organic material layer on the color filter layer, exposing light to the organic material layer using a photo mask that includes a first transmissive portion having a circular shape, a second transmissive portion having a rectangular shape, and a blocking portion, wherein the second transmissive portion includes first and second widths, and developing the light-exposed organic material layer to form a first patterned spacer and a second patterned spacer.

According to an embodiment of the present invention, a structure for a liquid crystal display device including an array substrate, a color filter substrate and a liquid crystal layer between the array substrate and the color filter substrate, the structure includes a first patterned spacer having a first shape, the first patterned spacer contacting the array substrate and the color filter substrate and corresponding to a thin film transistor of the array substrate, and a second patterned spacer having a second shape with a top area being larger than a bottom area, the top area contacting the color filter substrate and the bottom area spaced apart from the array substrate, wherein the first and second shapes are different from each other.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to the illustrated embodiments of the present invention, which are illustrated in the accompanying drawings.

Figure 1:
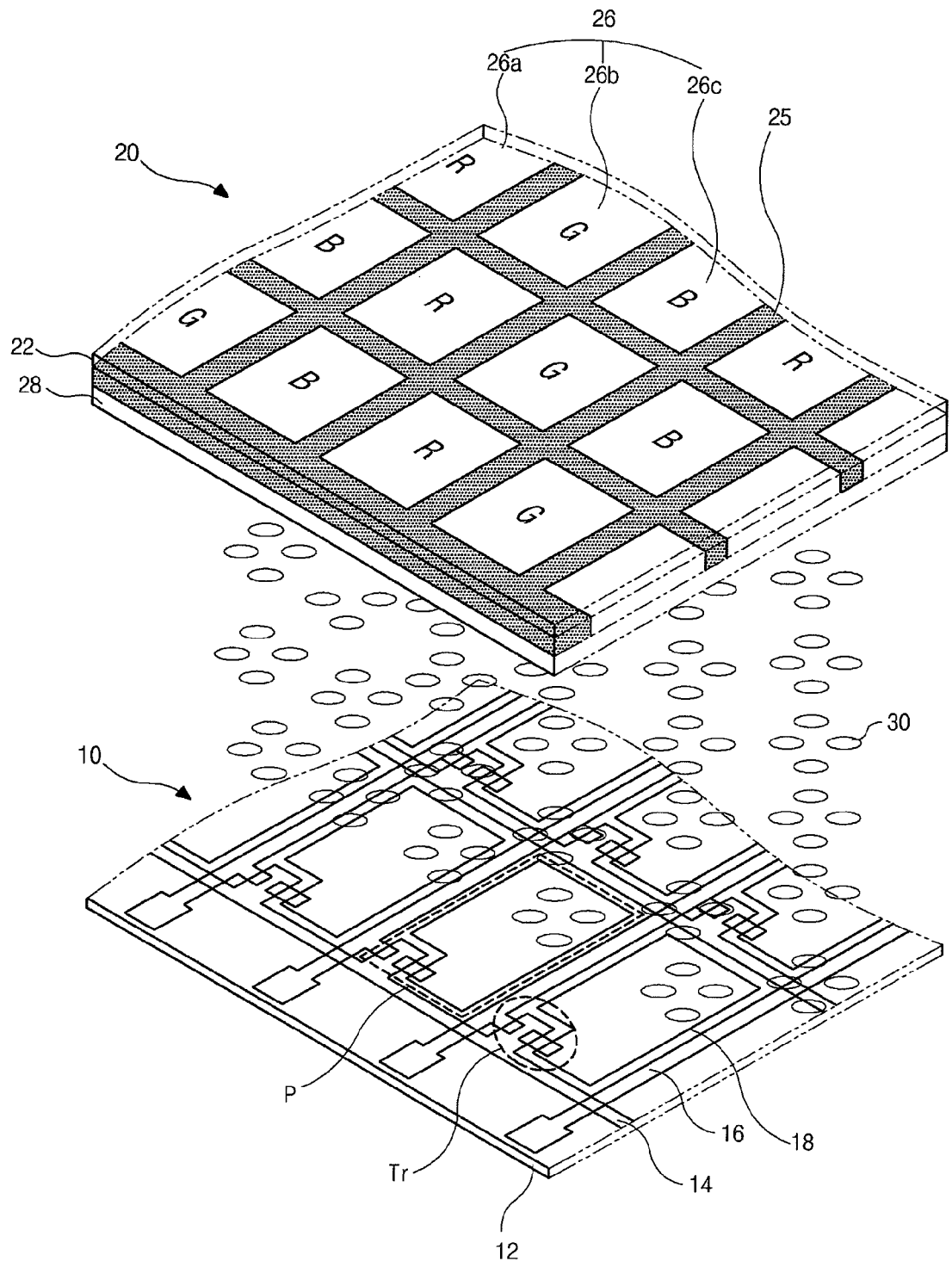
FIG. 1 is a perspective view illustrating an LCD device according to the related art.
Figure 2:
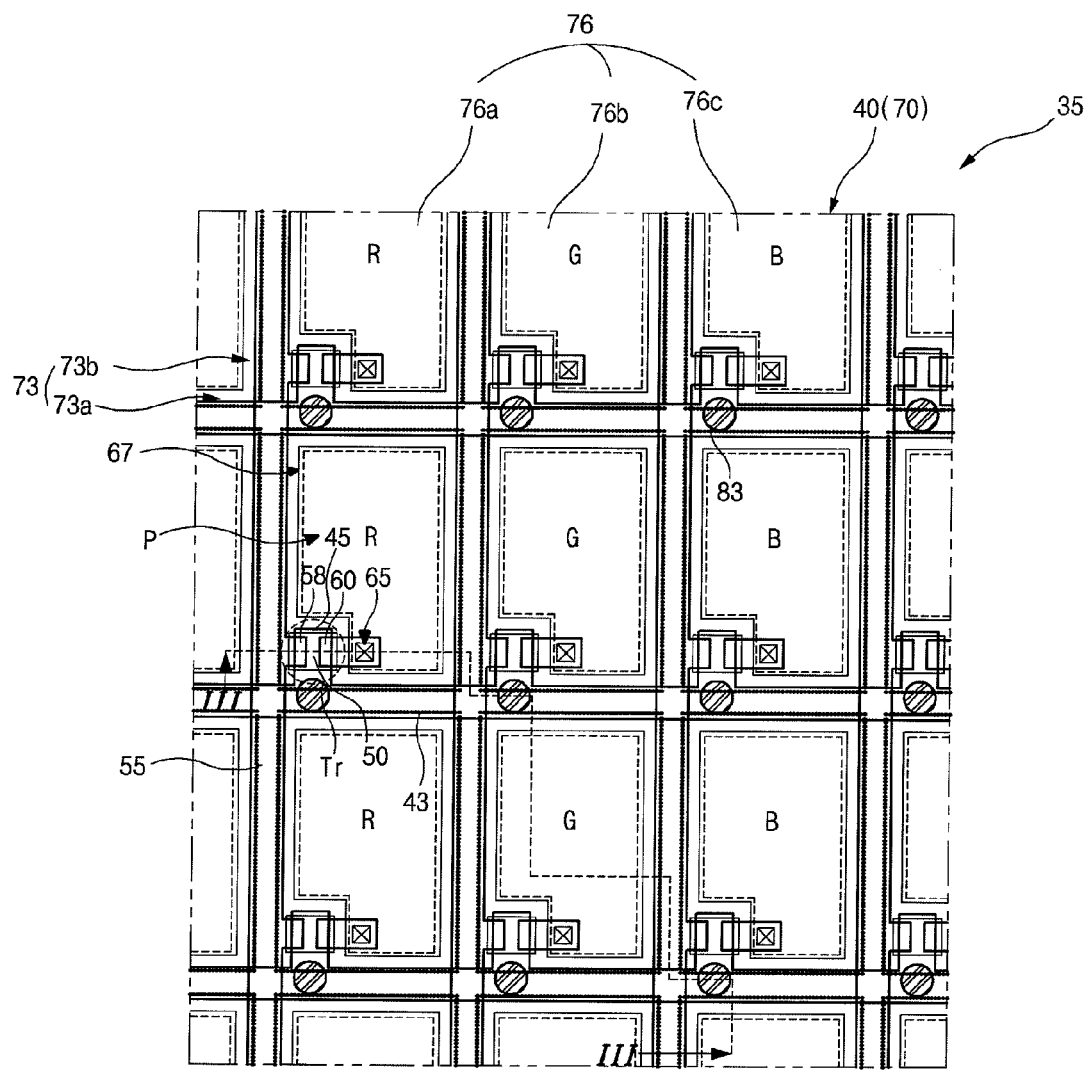
FIG. 2 is a plan view illustrating an LCD device including a patterned spacer according to the related art.
Figure 3:
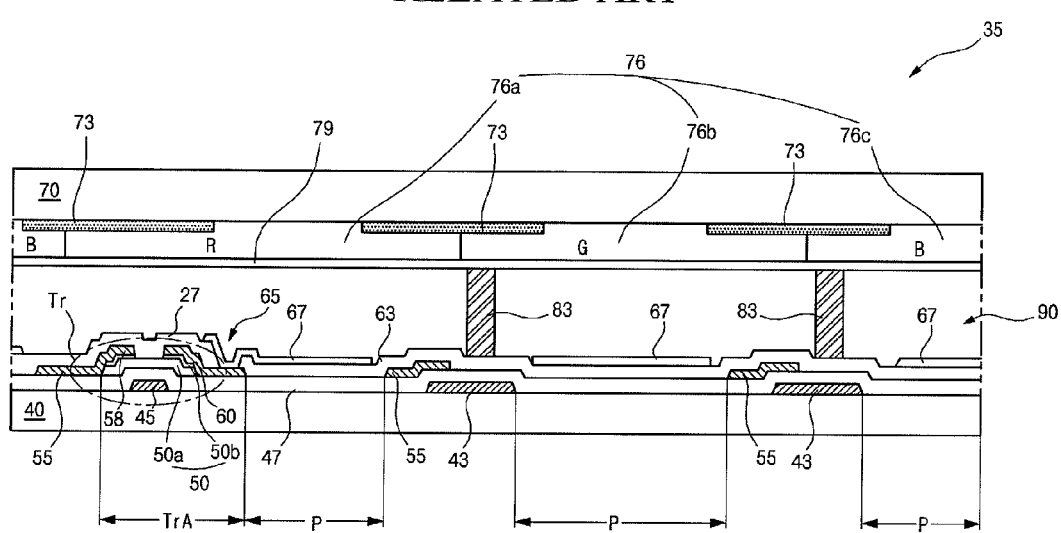
FIG. 3 is a cross-sectional view taken along a line III-III of FIG. 2.
Figure 4:
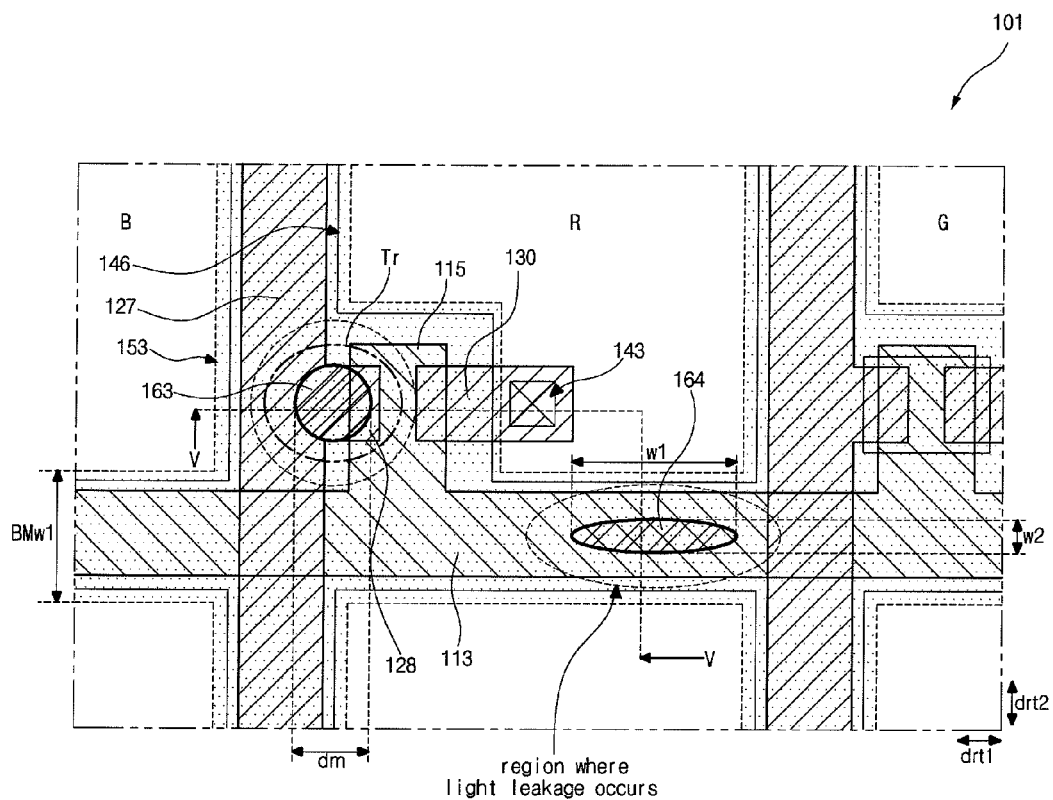
FIG. 4 is a plan view illustrating an LCD device according to an embodiment of the present invention.
Figure 5:
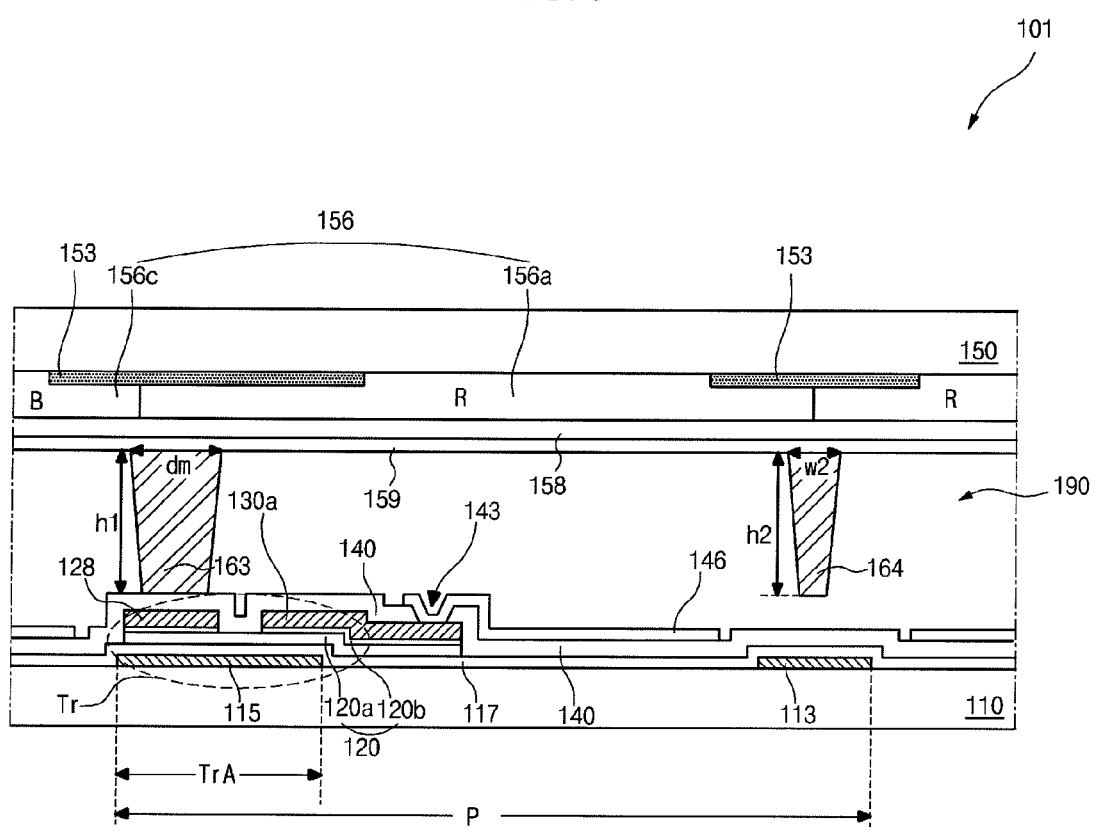
FIG. 5 is a cross-sectional view taken along a line V-V of FIG. 4.

FIG. 4 is a plan view illustrating an LCD device according to an embodiment of the present invention, and FIG. 5 is a cross-sectional view taken along a line V-V of FIG. 4.

Referring to FIGS. 4 to 6, the LCD device 101 includes an array substrate, a color filter substrate, and a liquid crystal layer 190 between the array substrate and the color filter substrate. Further, the LCD device includes first and second patterned spacers 163 and 164.

In the array substrate, a gate line 113 is formed on a first substrate 101 along a horizontal direction, and a gate electrode 115 is connected to the gate line 113. The gate electrode 115 may extend from the gate line 113. Alternatively, the gate electrode 115 may be a portion of the gate line 113. The gate line 113 and the gate electrode 115 may be formed of at least one of aluminum (Al), aluminum alloy (e.g., AlNd), copper (Cu), copper alloy, molybdenum (Mo), and molybdenum titanium (MoTi).

A gate insulating layer 117 is formed on the gate line 113 and the gate electrode 115. The gate insulating layer 117 may be formed of an inorganic insulating material including silicon oxide ($SiO_2$) and silicon nitride (SiNx).

A semiconductor layer 120 is formed on the gate insulating layer 117 over the gate electrode 113. The semiconductor layer 120 includes an active layer 120a made of intrinsic amorphous silicon, and an ohmic contact layer 120b made of extrinsic amorphous silicon.

Source and drain electrodes 128 and 130 are formed on the ohmic contact layer 120b. The source and drain electrodes 128 and 130 may have a bar shape. Alternatively, the source electrode 128 may have a dent portion to form a "U" shape, and the drain electrode 130 may be inserted into the dent portion, and in this case, a channel has a "U" shape. However, it should be understood that the source and drain electrodes 128 and 130 may have various configurations.

The gate electrode 115, the semiconductor layer 120 and the source and drain electrodes 128 and 130 form a thin film transistor Tr, which is located in a switching region TrA.

A data line 127 is connected to the source electrode 128. The data line 127 crosses the gate line 113 to define a pixel region P.

A semiconductor pattern may be formed below the data line 127. In this case, the semiconductor pattern may be formed of the same material as the semiconductor layer 120. For example, the semiconductor pattern may include a first dummy pattern made of the same material as the active layer 120a, and a second dummy pattern made of the same material as the ohmic contact layer 120b. Alternatively, the semiconductor pattern need not be formed below the data line 127.

A passivation layer 140 is formed on the source and drain electrodes 128 and 130. The passivation layer 140 may be formed of an inorganic insulating material including silicon oxide ($SiO_2$) and silicon nitride (SiNx). The passivation layer 140 includes a drain contact hole 143 exposing the drain electrode 130.

A pixel electrode 147 is formed in the passivation layer 140 in the pixel region P. The pixel electrode 147 contacts the drain electrode 130 through the drain contact hole 143. The pixel electrode 147 may be made of a transparent conductive material including indium-tin-oxide (ITO), indium-zinc-oxide (IZO), and indium-tin-zinc-oxide (ITZO).

In the color filter substrate, a black matrix 153 is formed on a second substrate 150. The black matrix 153 includes openings corresponding to the pixel regions P, respectively. The black matrix 153 may correspond to at lease one of the gate line 113, the data line 127 and the thin film transistor Tr. The black matrix 153 corresponds to one of the gate line 113, the data line 127, or the thin film transistor Tr, if the black matrix 153 overlaps, partially or entirely, with the gate line 113, the data line 127, or the thin film transistor Tr when looking at a planer view.

A color filter layer 156 is formed on the black matrix 153. The color filter layer 156 includes red (R), green (G) and blue color filter patterns 156a, 156b and 156c corresponding to the respective pixel regions P. The color filter patterns 156a, 156b and 156c fill the respective openings of the black matrix 153 and overlap the black matrix 153.

A common electrode 159 is formed on the color filter layer 156. The common electrode 159 may be made of a transparent conductive material including an indium-tin-oxide (ITO), an indium-zinc-oxide (IZO), and an indium-tin-zinc-oxide (ITZO).

An overcoat layer 158 may be formed between the color filter layer 156 and the common electrode 159. The overcoat layer 158 functions to planarize the color filter substrate.

In the above-described embodiment, the pixel electrode 146 and the common electrode 159 are formed in the different substrates i.e., the array substrate and the color filter substrate, respectively. Alternatively, the pixel electrode 146 and the common electrode 146 may be formed on the same substrate, for example, the array substrate. In this case, a plurality of pixel electrodes and a plurality of common electrodes may be alternately arranged in each pixel region to form an in-plane electric field, and a common line connected to the common electrode may be formed at the same level as the gate line 113.

The first and second patterned spacers 163 and 164 may be formed on the color filter substrate, for example, on the common electrode 159 or the overcoat layer 158. The first and second patterned spacers 163 and 164 may have a common thickness or different thicknesses by dozens of angstroms to thousands of angstroms.

The first patterned spacer 163 may have a cylindrical shape and correspond to the thin film transistor Tr. The second patterned spacer 164 may be spaced apart from the first patterned spacer 163. The second patterned spacer 164 may have a dam shape, such as an elliptical cylinder shape, such that a first width w1 of the second patterned spacer 164 along a length direction drt1 of the gate line 113 is greater than a second width w2 of the second patterned spacer 164 along a width direction of the gate line 113. Further, a top area of the second patterned spacer 164 contacting the color filter substrate is larger than a bottom area of the second patterned spacer 164 spaced apart from the array substrate.

It is preferred that a diameter dm of the first patterned spacer 163 may be in a range of about 18 µm to about 20 µm. It is preferred that the first width w1 of the second patterned spacer 164 may be in a range of about 22 µm to about 28 µm, and the second width of the second patterned spacer 164 may be in a range of about 5 µm to about 7 µm.

In comparison with the black matrix of the related art where the first and second patterned spacers have the same cylindrical shape, the black matrix 153 of the LCD device can be reduced by at least about 12 µm in width around the second patterned spacer 164 so that the aperture ratio can increase.

As described above, the second patterned spacer 164 is configured to relatively decrease the second width w2 and to relatively increase the first width w1. Accordingly, even though an external pressure creates a press on the LCD device, the second patterned spacer 164 and the first patterned spacer 163 are prevented from being crushed down. Further, since the restoring force is strengthened, when the external pressure is removed, the first and second patterned spacers 163 and 164 are rapidly restored to the original state maintaining the cell gap of the LCD device. As such, the first and second patterned spacers 163 and 164 of the embodiment can function as much as the cylindrical first and second patterned spacers of the related art.

An end of the first patterned spacer 163 having the first thickness t1 contacts the array substrate, for example, a first alignment layer, which may be a topmost layer of the array substrate, over the thin film transistor Tr. The second patterned spacer 164 is spaced apart from the array substrate and corresponds to the gate line 113.

The first and second patterned spacers 163 and 164 may be located corresponding to each pixel region P. Alternatively, the first and second patterned spacers 163 and 164 may be located at an interval of at least two pixel regions, for example, two pixel regions to twenties pixel regions.

A method of manufacturing the LCD device according to an embodiment is explained as below.

The array substrate of the LCD device may be formed in four or five mask processes, and detailed explanations may be omitted.

FIGS. 6A to 6H are cross-sectional views illustrating a color filter substrate of the LCD device according to an embodiment of the present invention.

Figure 6A:
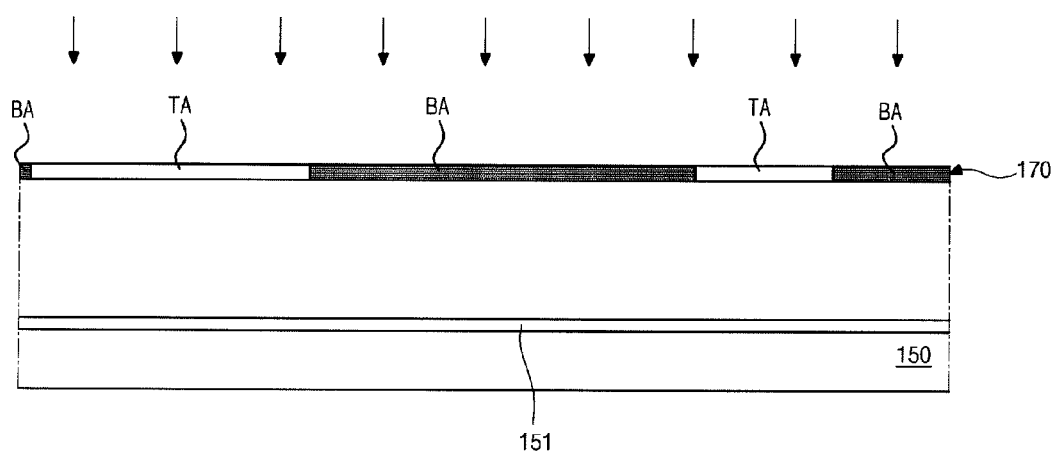
FIGS. 6A to 6H are cross-sectional views illustrating a color filter substrate of the LCD device of FIG. 4 according to an embodiment of the present invention.
Figure 6B:
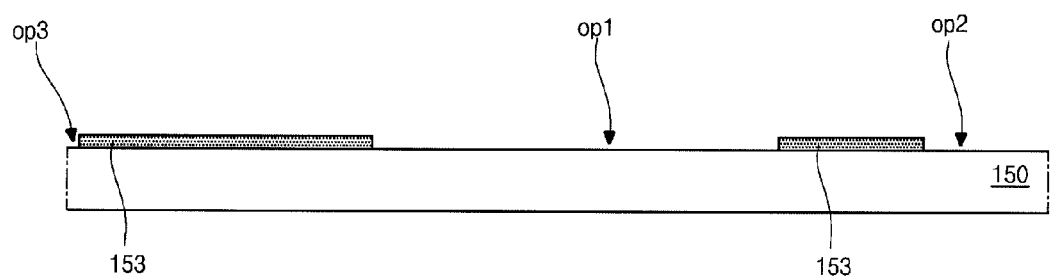

Referring to FIG. 6A, a black resin or a metallic material including at least one of a chromium (Cr) and a chromium oxide (CrOx) is formed on a substrate 150, and a mask process including a light-exposure with a photo mask 170, a developing and the like is performed to form the black matrix 153 including a plurality of openings op1, op2 and op3.

When the black matrix 153 is made of the black resin, a photo-sensitive material, a black resin layer 151 is formed by coating the substrate 150 with the black resin. Then, a light-exposure is performed for the black resin layer 151 using the photo mask 170 including a blocking portion BA and a transmissive portion TA. Then, the black resin layer 151 is developed using a developing solution. Accordingly, the black matrix 153 includes the openings op1, op2 and op3 corresponding to red, green and blue pixel regions, respectively.

When the black matrix 153 is made of the metallic material, a metallic material layer is formed on the substrate 150 and then a photoresist layer is formed on the metallic material layer. Then, the light-exposure and the developing processes are performed for the photoresist layer to form a photoresist pattern. Then, an etching process is performed for the metallic material layer using the photoresist pattern to form the black matrix 153. Then, the photoresist pattern is removed through an ashing or a stripping process.

In an embodiment, an example using the black matrix 153 made of the black resin is described.

It is preferred that a portion of the black matrix 153 corresponding to the gate line (113 of FIG. 4) and the data line (127 of FIG. 4) has a width (BMw1 of FIG. 4) of at most about 57 µm.

A second patterned spacer (164 of FIG. 4) to be formed corresponding to the gate line has a second width (w2 of FIG. 4) of about 5 µm to about 7 µm. A margin of the black matrix 153 is about 25 µm considering a defect of an alignment layer due to a push by an external pressure. Accordingly, to prevent the light leakage around the second patterned spacer 164, the width BMw1 of the black matrix 153 is designed to be at most 57 µm (e.g., 2*25 µm+7 µm).

Figure 7:
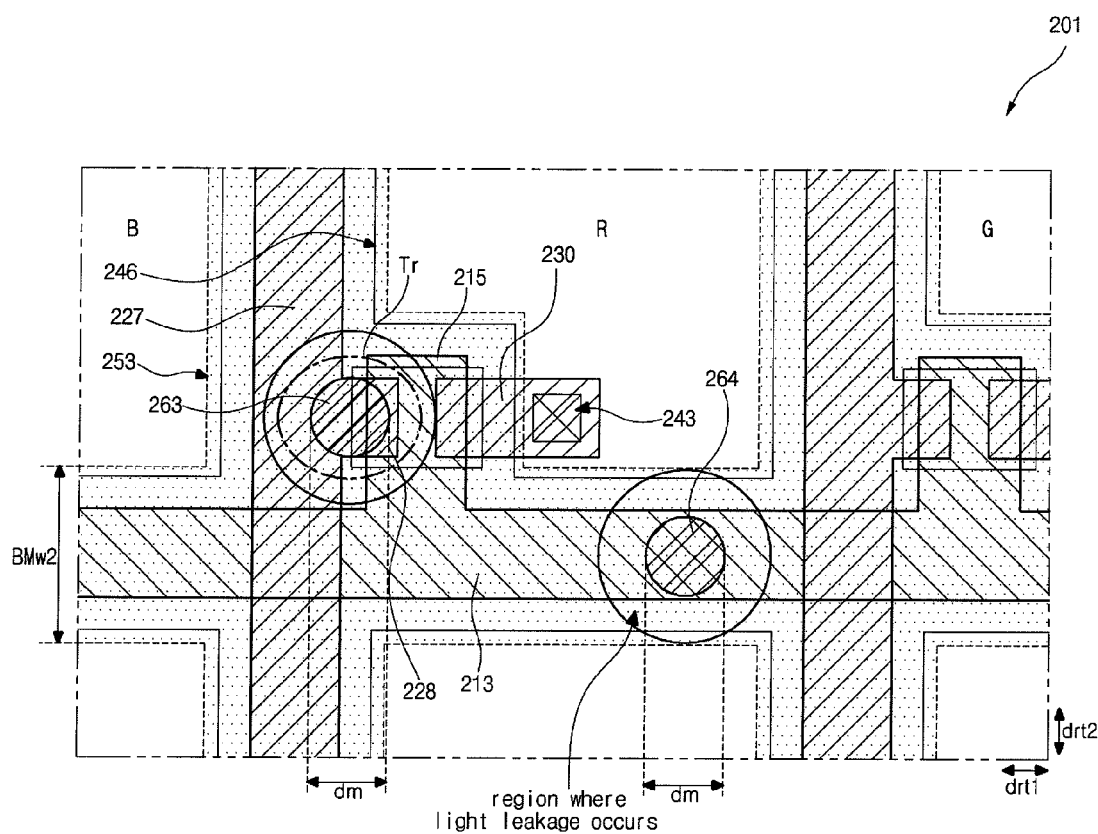
FIG. 7 is a plan view illustrating a comparative example of an LCD device according to an embodiment of the invention.

A comparative example is shown in FIG. 7. In FIG. 7, the components of the embodiment are indicated with reference numbers adding one hundred to the reference numbers of the previous components of the embodiment. Referring to FIG. 7, the cylindrical second patterned spacer 264 is used, a diameter dm of the second patterned spacer 264 is about 18 µm in consideration of the restoring force and the press prevention. A margin of a black matrix 253 is about 25 µm in consideration of the defect of the alignment layer due to a push by an external pressure. Accordingly, to prevent the light leakage around the second patterned spacer 264, a width BMw2 of the black matrix 253 should be at least 68 µm (e.g., 2*25 µm+18 µm).

As a result, a portion of the black matrix 153 corresponding to the gate line 113 (i.e., corresponding to the second patterned spacer 163) of the embodiment has the width BMw1 that is reduced by about 9 µm to about 11 µm when compared to that of the related art. Therefore, the aperture ratio can increase.

Figure 6C:
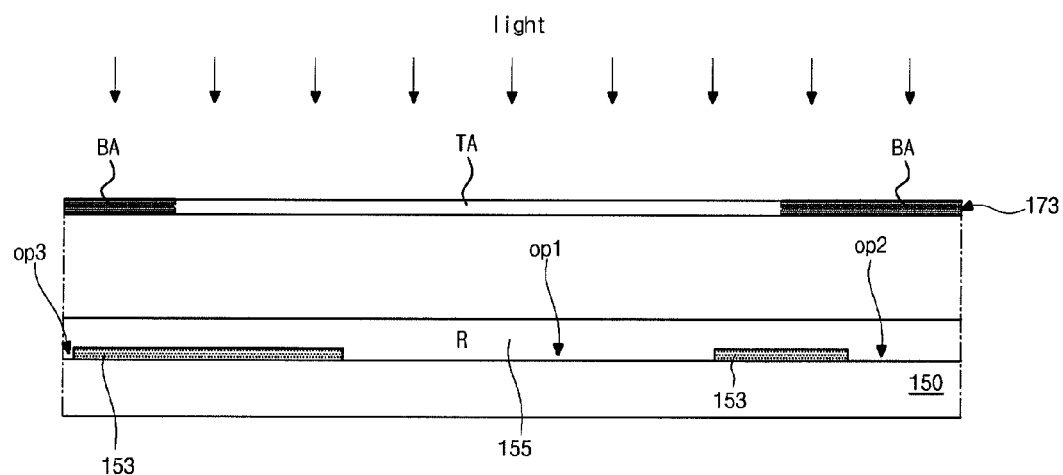

Referring to FIG. 6C, a red (R) resist is deposited on the substrate 150 including the black matrix 153 to form a red resist layer 155. Then, a light exposure is performed using a photo mask including a blocking portion BA and a transmissive portion TA. A negative type resist may be used for the red resist. Green and blue resists will later be described in detail.

In the light exposure, the transmissive portion TA of the photo mask 173 corresponds to the first opening op1.

Figure 6D:
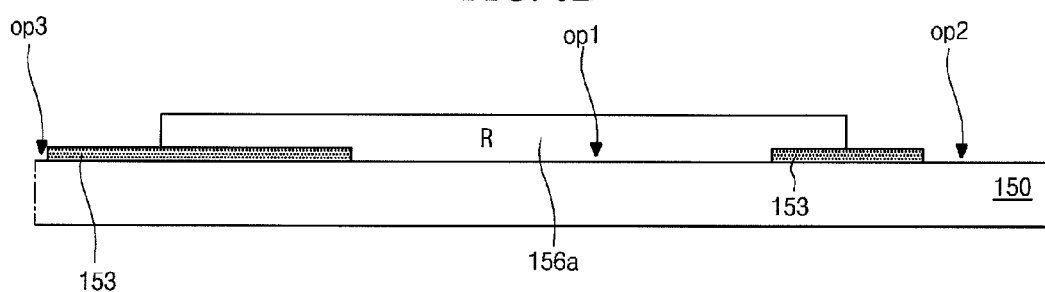

Referring to FIG. 6D, the red resist layer 155 is developed to form a red (R) color filter pattern 156a filling the first opening op1. The red (R) color filter pattern 156a may overlap with the black matrix 153.

Figure 6E:
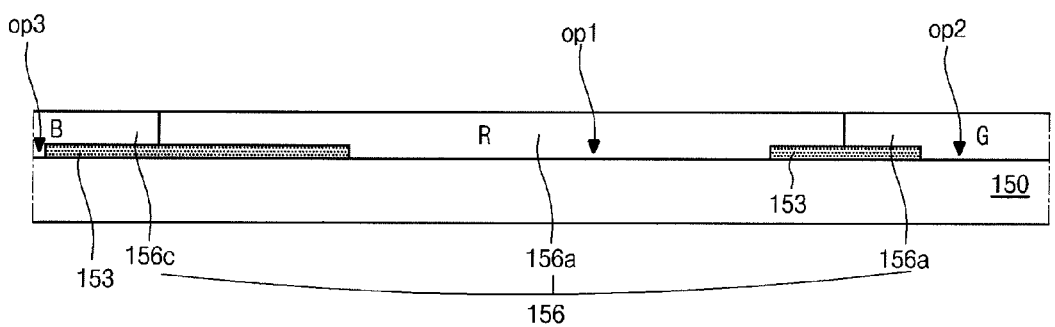

Referring to FIG. 6E, in a manner similar to forming the red (R) color filter pattern 156a, green (G) and blue (B) color filter patterns 156b and 156c are formed corresponding to the second and third openings op2 and op3, respectively. The red (R), green (G) and blue (B) color filter patterns 156a, 156b and 156c form a color filter layer 156.

Figure 6F:
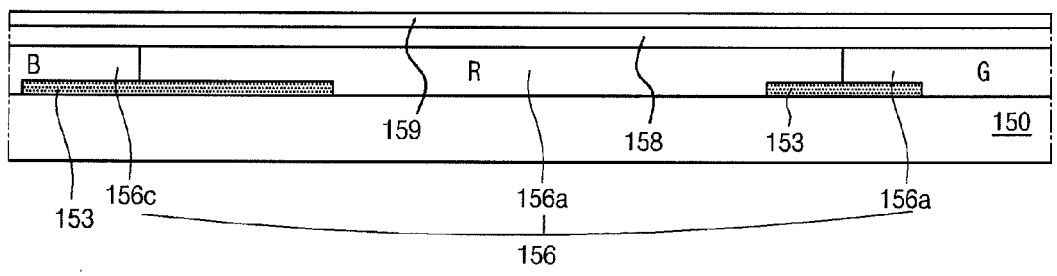

Referring to FIG. 6F, an overcoat layer 158 is formed on the color filter layer 156 and the black matrix 153. The overcoat layer 158 may be made of an organic material, for example, a photo acrylic or a photoresist.

Then, a transparent conductive material is deposited on the overcoat layer 158 to form a common electrode 159.

In the above explanations, the overcoat layer 158 and the common electrode 159 are formed on the color filter layer 156. Alternatively, the overcoat layer 158 may be omitted when the common electrode 159 is formed in the color filter substrate.

Figure 6G:
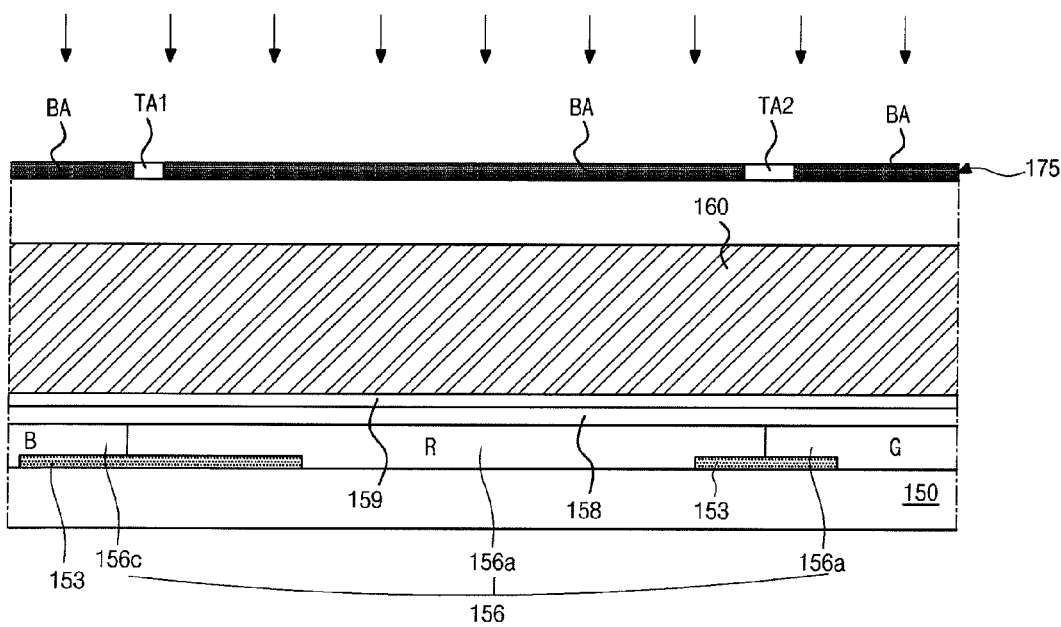
Figure 6H:
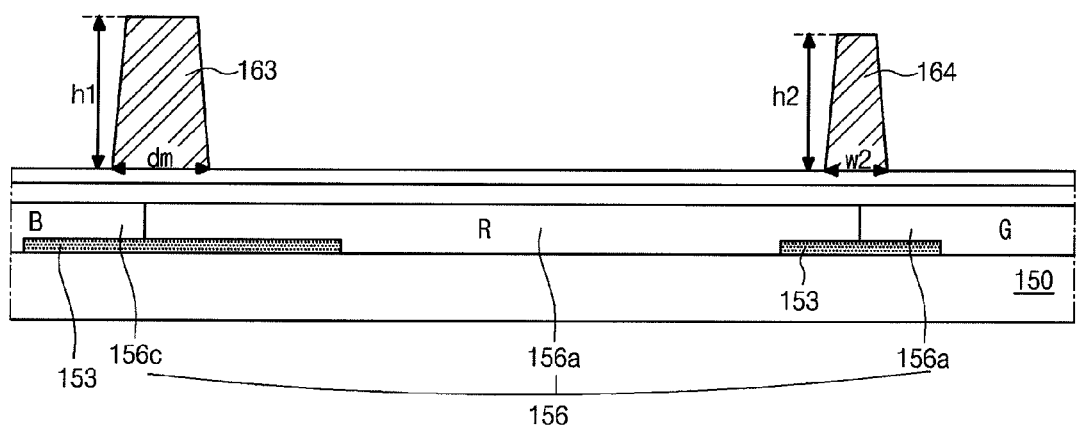

Referring to FIGS. 6G and 6H, a transparent organic material layer 160 is formed on the common electrode 159. The organic material layer 160 may be made of a negative type photo-sensitive material, for example, a photo acrylic or a photoresist.

A photo mask 175 is disposed over the organic material layer 160, and a light exposure is performed. The photo mask 175 may include first and second transmissive portions TA1 and TA2, and a blocking portion BA.

The first and second transmissive portions TA1 and TA2 correspond to regions for first and second patterned spacers 163 and 164, respectively.

Figure 8A:
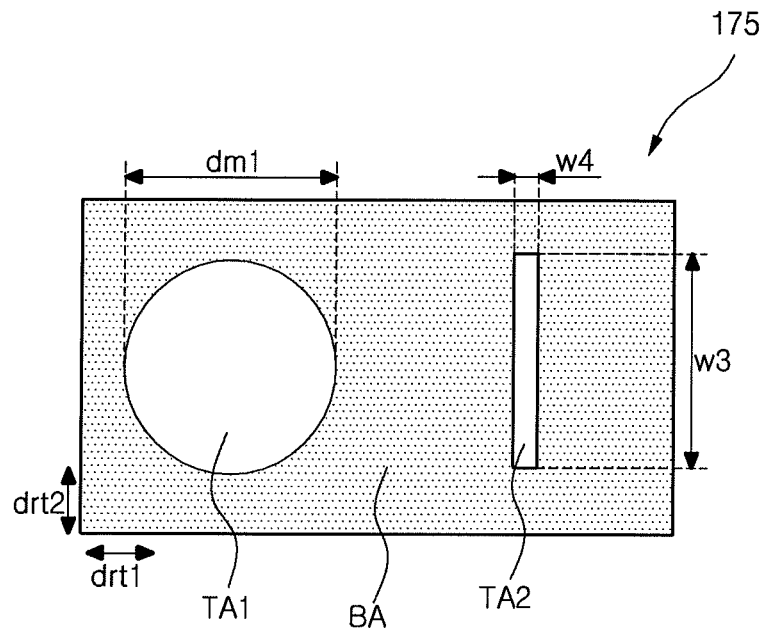
FIGS. 8A and 8B are plan views illustrating examples of photo masks used to form the first and second patterned spacers according to an embodiment of the present invention.
Figure 8B:
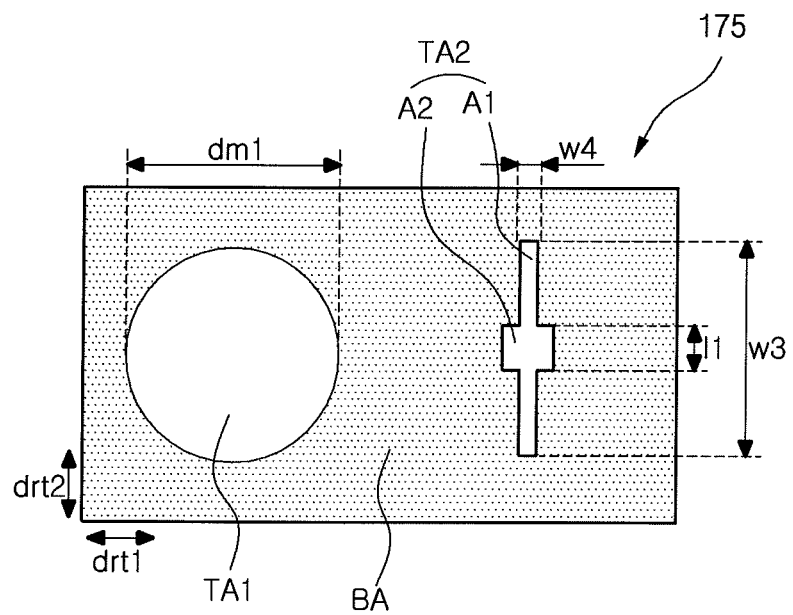
Figure 9:
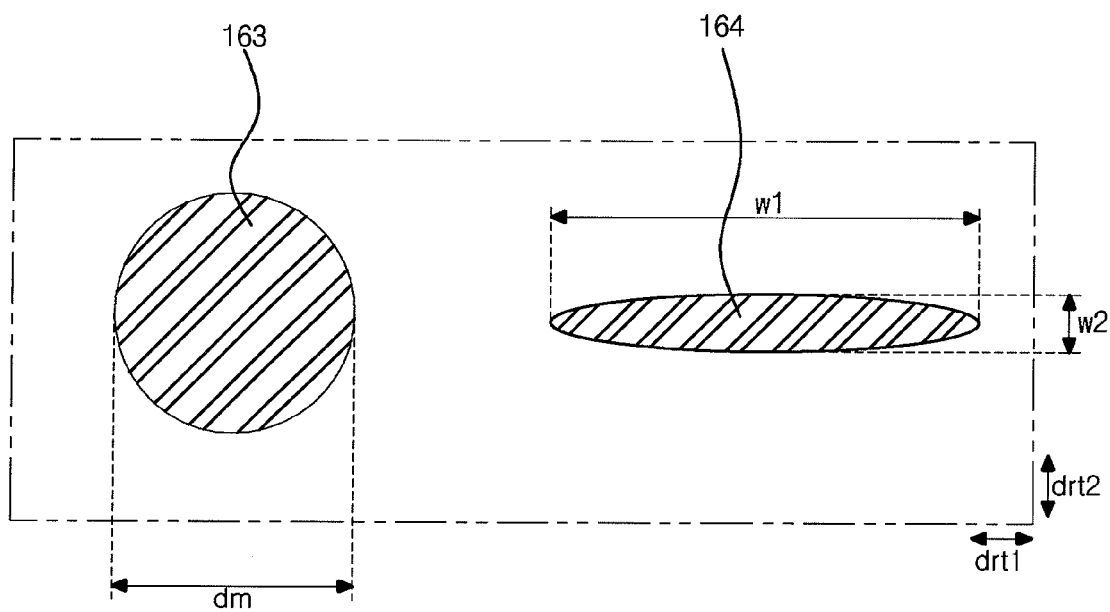
FIG. 9 is a plan view illustrating the first and second patterned spacers formed using the photo mask of FIG. 8A or 8B.

The photo mask 175 and the first and second patterned spacers 163 and 164 are explained in more detail with further reference to FIGS. 8A, 8B and 9.

FIGS. 8A and 8B are plan views illustrating examples of photo masks used to form the first and second patterned spacers according to an embodiment of the present invention, and FIG. 9 is a plan view illustrating the first and second patterned spacers formed using the photo mask of FIG. 8A or 8B.

Referring to FIG. 8A, the photo mask 175 used to form the first and second patterned spacers 163 and 164 includes the first transmissive portion TA1 that transmits light substantially without a loss of light and has a circular shape. The second transmissive portion TA2 has a rectangular shape, and a blocking portion BA that blocks light.

The first transmissive portion TA1 includes a diameter of about 10 μm to about 12 μm. The second transmissive portion TA2 has a third width w3, of about 9.5 μm to 10.5 μm, along the width direction drt2 of the gate line, and a fourth width w4, of about 1.8 μm to 2.2 μm, along the length direction drt1 of the gate line. The length of the third width w3 is configured to be, at least, larger than twice the length of the fourth width w4.

The blocking portion BA may be defined as a portion except for the first and second transmissive portions TA1 and TA2 of the photo mask 175.

Referring to FIG. 8B, the first transmissive portion TA1 is substantially the same as the first transmissive portion TA1 of FIG. 8A. The second transmissive portion TA2 has a first region A1 and a second region A2. The first region A1 is substantially the same as the second transmissive portion of FIG. 8A. The second region A2 is configured at a center region of the first region A1 and has a square shape that has a length l1 of about 2.8 μm to about 3.2 μm. Accordingly, the second transmissive portion TA2 has a cross (i.e., "+") shape. Here, the length of the length l1 is configured to be within the lengths of the third width w3 and the fourth width w4.

Returning to FIGS. 6G, 6H and 4, through the light exposure process using the photo mask 175 as described above and the developing process, a portion of the organic material layer 160 corresponding to the first and second transmissive portions TA1 and TA2 and exposed to light remains, and a portion of the organic material layer 160 corresponding to the blocking portion BA and not exposed to light are removed. Accordingly, the first and second patterned spacers 163 and 164 are formed.

In more detail, when the developing is performed for the organic material layer 160, the patterned spacer 163 having a first height h1 and a diameter dm of about 18 μm to about 20 μm is formed corresponding to the first transmissive portion TA1. Further, the second patterned spacer 164 having a first width w1 of about 22 μm to about 28 μm along the length direction drt1 of the gate line, a second width w2 of about 5 μm to 7 μm along the width direction drt2 of the gate line, and a second height h2 equal to or more than the first height h1 is formed corresponding to the second transmissive portion TA2 and having a dam shape, such as an elliptical cylinder shape.

In forming the first and second patterned spacers 163 and 164 according to an embodiment, the second transmissive portion TA2 has a plan shape substantially opposite to a plan shape of the second patterned spacer 164.

In more detail, referring to FIGS. 8A, 8B and 9, the second transmissive portion has a substantially rectangular shape in plane, where the third width w3 is about 9.5 μm to 10.5 μm along the width direction drt2 of the gate line, and the fourth width w4 is about 1.8 μm to 2.2 μm along the length direction drt1 of the gate line. Whereas the second patterned spacer 164 formed using the second transmissive portion TA2 has a substantially rounded rectangular shape in plane, where the first width w1 is about 22 μm to about 28 μm along the length direction drt1 of the gate line, and the second width w2 is about 5 μm to 7 μm along the width direction drt2 of the gate line. In other words, the second patterned spacer 164 has a plan shape like the plan shape of the second transmissive portion TA2 rotated through 90 degrees. This is because of the diffraction of light. That is, the second transmissive portion TA2 is configured to be a slit, and thus the diffraction of light is made in a direction of a narrow width. Accordingly, light irradiates relatively more widely in the direction of the narrow width. Therefore, as described above, the second patterned spacer 164 is formed to be relatively wider in the width direction of the gate line.

An amount of light exposure per unit area through the second transmissive portion TA2 may be relatively less because the light through the second transmissive portion TA2 irradiates relatively the more area due to the diffraction of light. Accordingly, the height h2 of the second patterned spacer 164 may be less than the first height h1 of the first patterned spacer 163 through the first transmissive portion TA1. Alternatively, the second height h2 may be equal to the first height h1 by adjusting the amount of time of the light exposure, for example, by relatively increasing the amount of time of the light exposure through the second transmissive portion TA2.

Referring to FIG. 8B, even when the cross-shaped second transmissive portion TA2 is used, the second patterned spacer 164 has substantially the same height and shape as that formed using the second transmissive portion TA2 in FIG. 8A. However, the cross-shape second transmissive portion TA2 in FIG. 8B may be more desirable because the cross shape transmissive portion significantly reduces sidelobe formation than the rectangular-shape transmissive portion. Here, the sidelobes are unwanted images in the final pattern.

Through the above-described processes, the color filter substrate and the first and second patterned spacers 163 and 164 can be manufactured. Further, the alignment layer for the color filter substrate may be formed by printing the alignment layer on the substrate 150 having the first and second patterned spacers 163 and 164.

The color filter substrate is coupled with the array substrate with the liquid crystal layer (156 of FIG. 5) therebetween. Accordingly, the first patterned spacer 163 contacts the array substrate corresponding to the thin film transistor Tr. The second patterned spacer 164 corresponds to the gate line (113 of FIG. 4), for example, a center portion of the gate line 113. When the array substrate and the color filter substrate are coupled, a seal pattern is configured to be along the peripheral portions of the array substrate and the color filter substrate.

Through the coupling of the array substrate and the color filter substrate, the LCD device can be manufactured.

As described above, the second patterned spacer is configured to have the second width of about 7 μm or less. Accordingly, to prevent the light leakage around the second patterned spacer, the black matrix 153 can be configured to have the width of about 57 μm or less.

As such, the black matrix of the embodiment has the width less than that of related art of about 68 μm. Therefore, the aperture ratio can be improved.

Further, to form the first and second patterned spacers different in height, the photo mask including the blocking portion and the different types of transmissive portions instead of an expensive conventional half-tone mask or slit type photo mask. Therefore, the production costs can be reduced.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of manufacturing a liquid crystal display device including an array substrate having gate and data lines crossing each other, the gate line having a length direction and a width direction, and the width direction being smaller than the length direction, the method comprising:
    forming a color filter substrate including a black matrix that is on a first substrate and includes an opening, wherein a color filter layer fills the opening;
    forming an organic material layer on the color filter layer;
    exposing light to the organic material layer using a photo mask that includes a first transmissive portion having a circular shape, a second transmissive portion having a rectangular shape, and a blocking portion;
    developing the light-exposed organic material layer to form a first patterned spacer and a second patterned spacer corresponding to the first transmissive portion and the second transmissive portion, respectively;
    forming an array substrate that includes gate and data lines crossing each other on a second substrate, a thin film transistor connected to the gate and data lines, a pixel electrode connected to the thin film transistor, and a passivation layer covering the thin film transistor, the thin film transistor having a source electrode and a drain electrode; and
    bonding the array substrate and the color filter substrate with a liquid crystal layer therebetween such that the first patterned spacer contacts the array substrate at the passivation layer corresponding to the source electrode of the thin film transistor, and the second patterned spacer corresponds to the gate line and spaced apart from the array substrate,
    wherein the second transmissive portion of the photo mask includes a first width along the length direction of the gate line and a second width along the width direction of the gate line that is perpendicular to the length direction, and the second width of the second transmissive portion being greater than the first width of second transmissive portion,
    wherein the second patterned spacer includes a third width along the length direction of the gate line and a fourth width along the width direction of the gate line, and the fourth width of the second pattern spacer being less than the third width of the second pattern spacer, and
    wherein the lesser first width of the second transmissive portion corresponds to the greater third width of the second pattern spacer, and the greater second width of the second transmissive portion corresponds to the lesser fourth width of the second patterned spacer.

2. The method according to claim 1, wherein the color filter substrate further includes an overcoat layer between the color filter layer and the first and second patterned spacers.

3. The method according to claim 1, wherein the color filter substrate further includes a common electrode between the color filter layer and the first and second patterned spacers.

4. The method according to claim 1, wherein the first width is about 1.8 μM to about 2.2 μm, the second width is about 9.5 μm to about 10.5 μm.

5. The method according to claim 1, wherein the third width ranges from about 22 μm to about 28 μm, and the fourth width ranges from about 5 μm to about 7 μm.

6. The method according to claim 1, wherein a width of the black matrix corresponding to the second patterned spacer is about 55 μm to about 57 μm.

7. The method according to claim 1, wherein a height of the second patterned spacer is equal to or less than a height of the first patterned spacer by adjusting an amount of time of the light exposure.

8. The method according to claim 1, wherein the second transmissive portion includes a square-shaped region, at a center portion thereof, that has a length of about 2.8 μm to about 3.2 μm, and the second transmissive portion has a cross shape.

* * * * *